(12) United States Patent
Kwon et al.

(10) Patent No.: US 10,090,783 B2
(45) Date of Patent: Oct. 2, 2018

(54) ENERGY CONVERSION DEVICE USING CHANGE OF CONTACT AREA AND CONTACT ANGLE OF LIQUID

(71) Applicants: Korea Electronics Technology Institute, Seongnam-si, Gyeonggi-do (RE); SEOUL NATIONAL UNIVERSITY R&DB FOUNDATION, Seoul (KR)

(72) Inventors: Soon Hyung Kwon, Seoul (KR); Won Keun Kim, Seongnam-si (KR); Chul Jong Han, Seoul (KR); Jeongno Lee, Yongin-si (KR); Youn Sang Kim, Suwon-si (KR); Jun Woo Park, Yongin-si (KR)

(73) Assignees: Korea Electronics Technology Institute, Seongnam-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 741 days.

(21) Appl. No.: 14/396,124

(22) PCT Filed: Oct. 30, 2013

(86) PCT No.: PCT/KR2013/009735
§ 371 (c)(1),
(2) Date: Oct. 22, 2014

(87) PCT Pub. No.: WO2014/069894
PCT Pub. Date: May 8, 2014

(65) Prior Publication Data
US 2015/0061459 A1    Mar. 5, 2015

(30) Foreign Application Priority Data

Oct. 31, 2012 (KR) .................. 10-2012-0121909

(51) Int. Cl.
*H02N 11/00* (2006.01)
*H02N 1/08* (2006.01)

(52) U.S. Cl.
CPC ............. *H02N 11/002* (2013.01); *H02N 1/08* (2013.01)

(58) Field of Classification Search
CPC .......... G04C 10/00; H02N 1/08; H02N 11/00; H02N 11/002; H02N 3/00; F02B 63/04;
(Continued)

(56) References Cited

U.S. PATENT DOCUMENTS

| 7,545,430 B2 | 6/2009 | Nakagawa |
| 7,898,096 B1 | 3/2011 | Krupenkin |

(Continued)

FOREIGN PATENT DOCUMENTS

| JP | 3501216 B2 | 3/2004 |
| JP | 2005-522162 A | 7/2005 |

(Continued)

OTHER PUBLICATIONS

European Patent Office, Communication dated Dec. 11, 2015, issued in corresponding European Application No. 13850118.4.
(Continued)

*Primary Examiner* — Tran Nguyen (57) ABSTRACT

The present invention relates to a method and a device for converting energy using a change of a contact area and a contact angle of liquid and, more specifically, to a method and a device for converting mechanical energy into electric energy by applying a reciprocal phenomenon of electrowetting, wherein liquid and gas are positioned between two facing substrates and energy is converted by using a volume change of a fluid, such that the present invention has the advantages of preventing channel-blocking without requiring all facing electrodes to be patterned, simplifying a device
(Continued)

configuration, implementing easy control, and removing the need to apply an external power source.

26 Claims, 3 Drawing Sheets

(58) Field of Classification Search
CPC .......... H02K 33/00; H02K 35/06; H01G 5/00; H01G 5/01; H01G 5/012; H01G 5/16; H01L 41/113
See application file for complete search history.

(56) References Cited

U.S. PATENT DOCUMENTS

| | | |
|---|---|---|
| 2006/0077762 A1 | 4/2006 | Boland et al. |
| 2008/0080035 A1 | 4/2008 | Sugahara |
| 2010/0026143 A1 | 2/2010 | Pelri Ne et al. |
| 2010/0295415 A1 | 11/2010 | Despesse et al. |
| 2012/0181901 A1 | 7/2012 | Krupenkin et al. |

FOREIGN PATENT DOCUMENTS

| | | |
|---|---|---|
| JP | 2005185090 A | 7/2005 |
| JP | 2008-507250 A | 3/2008 |
| JP | 2008092613 A | 4/2008 |
| JP | 2011-507479 A | 3/2011 |
| WO | 2009/083542 A1 | 7/2009 |

OTHER PUBLICATIONS

Tom Krupenkin et al., "Reverse electrowetting as a new approach to high-power energy harvesting", Nature Communications, Aug. 23, 2011, vol. 2, DOI: 10.1038/ncomms1454, XP55232099, 8 pages total.

Korea Intellectual Property Office, Office Action in KR 10-2012-0121909 dated Jul. 19, 2014.

International Searching Authority, International Search Report for PCT/KR2013/009735 dated Nov. 20, 2013.

ENERGY CONVERSION DEVICE USING CHANGE OF CONTACT AREA AND CONTACT ANGLE OF LIQUID

CROSS REFERENCE TO RELATED APPLICATIONS

This application is a National Stage of International Application No. PCT/KR2013/009735 filed Oct. 30, 2013, claiming priority based on Korean Patent Application No. 10-2012-0121909 filed Oct. 31, 2012, the contents of all of which are incorporated herein by reference in their entirety.

TECHNICAL FIELD

The present invention relates to a method and a device for converting energy using a fluid, more specifically, to a method and a device for converting mechanical energy into electrical energy by applying an reciprocal phenomenon of electrowetting.

BACKGROUND ART

The energy conversion technologies for converting mechanical energy into electrical energy of prior art use a principle that an electrical capacitance is being created in the electrode under a dielectric material by varying the contact area of a liquid metal which is being contact with a dielectric material in accordance with the flow of time.

A method and a device for converting energy using a fluid of prior art is being disclosed in the U.S. Pat. No. 7,898,096.

Figure 1:
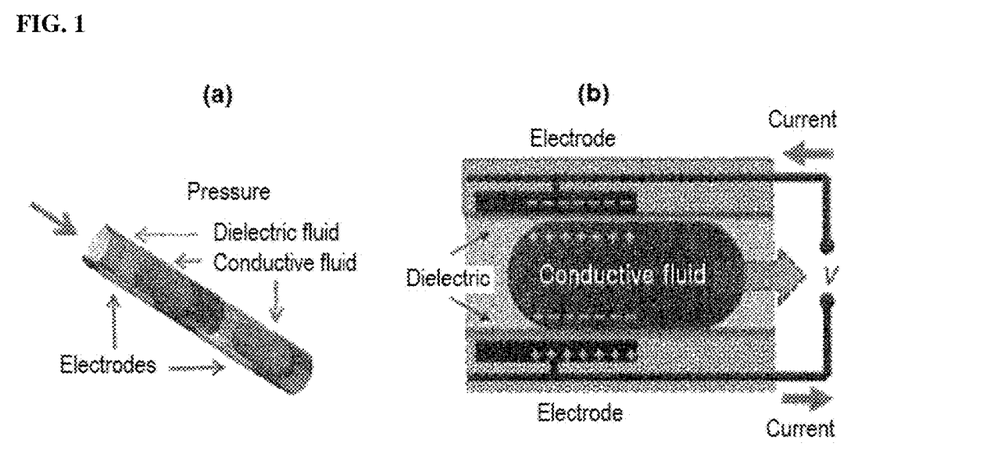
FIGS. 1(a) and 1(b) are a block diagram of a device for converting energy using a fluid of prior art.

FIG. 1 (a) and 1(b) are a block diagram of a device of prior art for converting energy using a fluid. According to FIGS. 1(a) and 1(b), in a device of prior art for converting energy using a fluid, an electrode is formed to have a consistent pattern on the wall of a thin and long channel, and a dielectric material layer is formed above the electrode.

Then, a little waterdrop-like conductive liquid and a non-conductive liquid are being injected into the channel, and by applying a voltage from an external power source to such a waterdrop-like conductive liquid, the conductive liquid is being depolarized.

At this state, when a physical pressure is applied to a predetermined portion (not shown) which is connected to the channel the depolarized waterdrop-like conductive liquid is moved along the channel, and during this process, the contact area of the multiple electrodes, which is formed with a consistent pattern, with the moving multiple conductive liquid drop is continuously changing with time, and as a result, an electrical energy is generated due to the electrical capacitance change.

However, a method and a device of prior art for converting energy using a fluid have various problems for commercialization.

First, since a reversible movement, wherein a drop-like liquid metal, which has been moved inside the narrow and thin channel, is returning back to its original position when the external force is removed, is difficult, there is a limitation in that a separate lubricating layer is required and an inoperable condition happens due to the easy occurrence of the channel blocking phenomenon.

Moreover, since a method and a device of prior art for converting energy using a fluid adopt a narrow and thin channel structure, the two facing electrodes must be patterned with a fixed shape on the channel wall, and the device configuration becomes complicated due to such a structure, and the size of the module producing electrical energy becomes large, and there are many limitation in mass production or cost reduction.

In addition, as for other problems, it is harmful to the human body and the environment by using a liquid metal such as mercury or galinstan, and there is a limitation in that application of an external separate power source is required for depolarizing such a conductive liquid.

Further, a method and a device of prior art for converting energy using a fluid has problems in that the reversible movements in the channel structure must be continuously implemented, and the control is difficult since the two different kinds of immiscible liquids must be used.

SUMMARY OF INVENTION

Technical Problem

An objective of the present invention is to provide a method and a device for converting energy using a fluid which converts mechanical energy into electrical energy by changing the contact angle and contact area of the liquid contacting the electrode using a physical force.

Solution to Problem

To achieve above described objective, an energy converting device utilizing the changes in the contact angle and the contact area of a liquid is provided which includes: a lower and an upper electrodes whose gap therebetween is varying by an external physical force; an ionic liquid or a water whose contact angle and contact area with at least one from said electrodes are varying in accordance with the changes in the gap between said electrodes; and an energy conversion layer, which is formed in at least one of said electrode substrates, and generating electrical energy in accordance with the changes in said contact angle and said contact area.

Preferably, it is being characterized in that a partition for supporting the gap between said lower electrode substrate and said upper electrode substrate, and for isolating the inside and the outside of the device, is further included.

Preferably, it is being characterized in that a non-conductive gas disposed between said lower electrode substrate and said upper electrode substrate, which are separated by said partition, is further included.

Preferably, it is being characterized in that said energy conversion layer is formed by stacking an inorganic material layer and an organic material layer, and a hydrophobic material layer is stacked so that the shape of said ionic liquid or water on the electrode substrate in contact with said energy conversion layer or the ionic liquid can be restored to the original shape when the external physical force is removed.

Preferably, it is being characterized in that at least one or more of said lower electrode substrate, said upper electrode substrate, or said partition is being restored to the original shape thereof when the external physical force is removed.

Preferably, it is being characterized in that said partition has at least any one shape of a rectangle, a triangle, an inverted triangle, a circle, an ellipse, or a cylinder, and is formed to be a triangular shape, a rectangular shape, a pentagonal shape, a hexagonal shape, a circular shape, a grid shape, or a honeycomb shape by said partition, so that said energy conversion device can be connected in arrays.

Preferably, it is being characterized in that the gap between said upper electrode substrate and said lower electrode substrate is determined by the size of diameter of said ionic liquid or water.

Preferably, it is being characterized in that said organic material layer includes at least any one material of polymethylmethacrylate(PMMA), polyethylene(PE), polystyrene (PS), polyvinylpyrrolidone(PVP), poly(4-vinylpenol; PVP) or polyethersulfone(PES), poly(4-methoxyphenylacrylate; PMPA), poly(phenylacrylate; PPA), poly(2,2,2-trifluoroethyl methacrylate; PTFMA), cyanoethylpullulan (CYEPL), polyvinyl chloride(PVC), poly(parabanic acid resin; PPA), poly(t-butylstyrene; PTBS), polythienylenevinylene (PTV), polyvinyl acetate (PVA), poly(vinyl alcohol; PVA), poly (rmethylstyrene; PAMS), poly(vinyl alcohol)-co-poly(vinyl acetate)-co-poly(itaconic acid) (PVAIA), polyolefin, polyacrylate, parylene-C, polyimide, octadecyltrichlorosilane (OTS), poly(triarylamine; PTTA), poly-3-hexylthiophene (P3HT), cross-linked poly-4-vinylphenol(cross-linked PVP), poly(perfluoroalkenylvinyl ether), nylon-6, n-octadecylphosphonic acid (ODPA); and said inorganic material layer includes at least any one material of $SiO_2$, $TiO_2$, $Al_2O_3$, $Ta_2O_5$, tantalum pentoxide, zinc oxide (ZnO), tantalum pentoxide($Ta_2O_5$), yttrium oxide ($Y_2O_3$), cerium oxide ($CeO_2$), titanium dioxide($TiO_2$), barium titanate($BaTiO_3$), barium zirconate titanate(BZT), zirconium dioxide($ZrO_2$), lanthanum oxide($La_2O_3$), hafnon($HfSiO_4$), lanthanum aluminate($LaAlO_3$), silicon nitride($Si_3N_4$), as perovskite materials, strontium titanate(SrTiO3), barium strontium titanate (BST), lead zirconate titanate(PZT), calcium copper titanate (CCTO), or $HfO_2$.

Preferably, it is being characterized in that said hydrophobic material layer includes at least any one of silane family material, fluoropolymer material, trichlorosilane, trimethoxysilane, pentafluorophenylpropyltrichlorosilane, (benzyloxy)alkyltrimethoxysilane(BSM-22), (benzyloxy) alkyltrichlorosilane(BTS), hexamethyldisilazane(HMDS), octadecyltrichlorosilane(OTS), octadecyltrimethoxysilane (OTMS), and divinyltetramethyldisiloxane-bis(benzocyclobutene)(BCB).

Preferably, it is being characterized in that said lower electrode substrate or said upper electrode substrate includes an electrode, and said electrode is an inorganic electrode including at least any one of ITO, IGO, chrome, aluminum, indium zinc oxide(IZO), indium gallium zinc oxide(IGZO), ZnO, $ZnO_2$ or $TiO_2$; or a metal electrode including at least any one of aluminum, iron or copper; or an organic electrode including at least any one of polyethylenedioxythiophene (PEDOT), carbon nano tube(CNT), graphene, polyacetylene, polythiophene(PT), polypyrrole, polyparaphenylene (PPV), polyanilinep), poly sulfur nitride or polyparaphenylenevinylene.

Preferably, it is being characterized in that at least any one of said lower electrode substrate or said upper electrode substrate is a metal substrate, a glass substrate, or a polymer material substrate; said polymer substrate includes at least any one of polyethylene terephthalate(PET), polyarylate (PAR), polymethylmethacrylate(PMMA), polyethylenenaphthalate(PEN), polyethersulfone(PES), polyimide (PI), polycarbonate(PC) or fiber reinforced plastics(FRP).

Preferably, it is being characterized in that said ionic liquid includes at least any one of NaCl, LiCl, $NaNo_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol or AgCl.

Preferably, it is being characterized in that said non-conductive gas includes at least any one of air, oxygen, nitrogen, argon, helium, neon, krypton, xenon, or radon.

Furthermore, an energy converting device utilizing the changes in the contact angle and the contact area of a liquid is provided which includes: a lower electrode substrate and an upper electrode substrate whose gap therebetween is being changed by an external physical force; a conductive liquid whose contact angle and contact area with at least one from the electrode substrates are varying in accordance with the changes in the gap between said electrode substrates; and an energy conversion layer, which is formed in said lower electrode substrate or said upper electrode substrate, for performing depolarizing function for the ionic liquid in accordance with said changes.

Preferably, it is being characterized in that a partition for supporting the gap between said lower electrode substrate and said upper electrode substrate, and for isolating the inside and the outside of the device, is further included.

Preferably, it is being characterized in that a non-conductive gas disposed between said lower electrode substrate and said upper electrode substrate, which are separated by said partition, is further included.

Preferably, it is being characterized in that said energy conversion layer is formed by stacking an inorganic material layer and an organic material layer, and a hydrophile material layer is stacked on said energy conversion layer so that the shape of said conductive liquid can be restored to the original shape when the external physical force is removed.

Preferably, it is being characterized in that at least one or more of said lower electrode substrate, said upper electrode substrate, or said partition is being restored to the original shape thereof when the external physical force is removed.

Preferably, it is being characterized in that said partition has at least any one shape of a rectangle, a triangle, an inverted triangle, a circle, an ellipse, or a cylinder, and is formed to be a triangular shape, a rectangular shape, a pentagonal shape, a hexagonal shape, a circular shape, a grid shape, or a honeycomb shape by said partition, so that said energy conversion device can be connected in arrays.

Preferably, it is being characterized in that the gap between said upper electrode substrate and said lower electrode substrate is determined by the size of diameter of said conductive liquid.

Preferably, it is being characterized in that said organic material layer includes at least any one material of polymethylmethacrylate(PMMA), polyethylene(PE), polystyrene (PS), polyvinylpyrrolidone(PVP), poly(4-vinylpenol; PVP) or polyethersulfone(PES), poly(4-methoxyphenylacrylate; PMPA), poly(phenylacrylate; PPA), poly(2,2,2-trifluoroethyl methacrylate; PTFMA), cyanoethylpullulan(CYEPL), polyvinyl chloride(PVC), poly(parabanic acid resin; PPA), poly(t-butylstyrene; PTBS), polythienylenevinylene(PTV), polyvinylacetate(PVA), poly(vinyl alcohol; PVA), poly(rmethylstyrene; PAMS), poly(vinyl alcohol)-co-poly(vinyl acetate)-co-poly(itaconic acid)(PVAIA), polyolefin, polyacrylate, parylene-C, polyimide, octadecyltrichlorosilane (OTS), poly(triarylamine; PTTA), poly-3-hexylthiophene (P3HT), cross-linked poly-4-vinylphenol(cross-linked PVP), poly(perfluoroalkenylvinyl ether), nylon-6, n-octadecylphosphonic acid(ODPA); and said inorganic material layer includes at least any one material of $SiO_2$, $TiO_2$, $Al_2O_3$, $Ta_2O_5$, tantalum pentoxide, zinc oxide(ZnO), tantalum pentoxide($Ta_2O_5$), yttrium oxide($Y_2O_3$), cerium oxide($CeO_2$), titanium dioxide($TiO_2$), barium titanate($BaTiO_3$), barium zirconate titanate(BZT), zirconium dioxide($ZrO_2$), lanthanum oxide($La_2O_3$), hafnon($HfSiO_4$), lanthanum aluminate ($LaAlO_3$), silicon nitride($Si_3N_4$), as perovskite materials, strontium titanate(SrTiO3), barium strontium titanate(BST), lead zirconate titanate(PZT), calcium copper titanate(CCTO), or $HfO_2$.

Preferably, it is being characterized in that said hydrophobic material layer includes at least any one material of poly acrylic acid(PAA), acrylamides, maleic anhydride copolymers, methacrylate, ethacrylate, amine-functional polymers, amine-functional polymers, polystyrenesulfonate (PSS), vinyl acids, vinyl alcohols, or functional group of —NH, —CO—, amino group —NH2, hydroxyl group —OH or carboxyl group —COOH.

Preferably, it is being characterized in that said lower electrode substrate or said upper electrode substrate includes an electrode, and said electrode is an inorganic electrode including at least any one of ITO, IGO, chrome, aluminum, indium zinc oxide(IZO), indium gallium zinc oxide(IGZO), ZnO, $ZnO_2$ or $TiO_2$; or a metal electrode including at least any one of aluminum, iron or copper; or an organic electrode including at least any one of polyethylenedioxythiophene (PEDOT), carbon nano tube(CNT), graphene, polyacetylene, polythiophene(PT), polypyrrole, polyparaphenylene (PPV), polyanilinep), poly sulfur nitride or polyparaphenylenevinylene.

Preferably, it is being characterized in that at least any one of said lower electrode substrate or said upper electrode substrate is a metal substrate, a glass substrate, or a polymer material substrate; said polymer substrate includes at least any one of polyethylene terephthalate(PET), polyarylate (PAR), polymethylmethacrylate(PMMA), polyethylenenaphthalate(PEN), polyethersulfone(PES), polyimide (PI), polycarbonate(PC) or fiber reinforced plastics(FRP).

Preferably, it is being characterized in that said conductive liquid may use mercury, lithium, gallium, kalium, NaK, bismuth, tin, natrium, natrium-kalium alloy, and the like; the range of the specific resistivity is 1 $\mu\Omega/\S^-$ to 1000 $\mu\Omega/\S^-$, and the dielectric constant K is under 5.

Preferably, it is being characterized in that said non-conductive gas includes at least any one of air, oxygen, nitrogen, argon, helium, neon, krypton, xenon, or radon.

Other specific details of the exemplary embodiments are included in the detailed description and the drawings.

Advantageous Effects of Invention

The present invention varies the gap between a pair of electrodes by using an external physical force, and utilizes the resulting changes in the contact angle and the contact area of the liquid in electrical energy generation; thus, it has an effect of implementing an energy conversion device having less failures with a simplified device structure and a reduced manufacturing cost by preventing the channel blocking phenomenon, and by not requiring any lubrication layer, or any complicatedly patterned electrodes on the channel.

In addition, the present invention has an advantage that an effective electrical energy conversion is possible without separately applying an external power source.

And, the present invention has an effect on solving the harmful problem to the human body and the environment by using an ionic liquid or a water.

DETAILED DESCRIPTION OF EMBODIMENT

The advantages and the features of the present invention, and the method for achieving thereof will become apparent with reference to the exemplary embodiments described in detail hereinafter with the accompanying drawings. However, the present invention will not be limited to the exemplary embodiments described hereinafter, but will be implemented in a various different forms, and the exemplary embodiments are provided for the completeness of the disclosure of the present invention and to teach an ordinary person of skill in the art of the scope of the invention completely, and the present invention is only be defined by the scope of the claims. Meanwhile, the terms used in the description, is for describing the exemplary embodiments, but not to limit the present invention.

Figure 2:
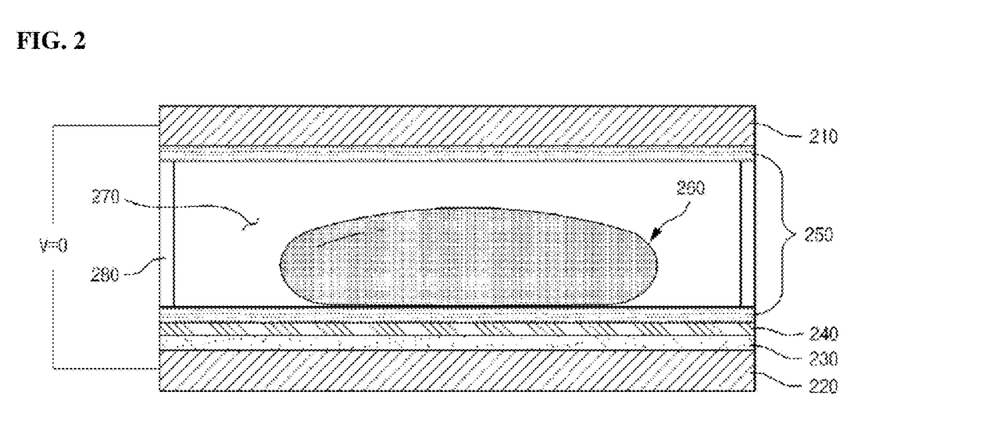
Fig. 2 is a structural drawing of a device for converting energy using the contact angle and the contact area of a liquid of the present invention.

FIG. 2 is a block diagram of a device for converting energy using a fluid according to an exemplary embodiment of the present invention. According to FIG. 2, a device for converting energy using a fluid according to an exemplary embodiment of the present invention includes a lower electrode substrate 220 and an upper electrode substrate 210 facing each other, wherein an electrode is disposed on said electrode substrate, and an ionic liquid or a water 260 is located in between the pair of electrodes.

Preferably, a non-conductive gas 270 is filled in the space between the lower electrode substrate 220 and the upper electrode substrate 210.

In such a device for converting energy using the contact angle and the contact area of a liquid according to an exemplary embodiment of the present invention, the distance between the upper electrode substrate and the lower electrode substrate, i.e. the gap, is changing when an external physical force is applied, and by the reacting force thereof, the contact area and the contact angle of the ionic liquid and the water, which are being contact with the upper electrode substrate 210 or the lower electrode substrate 220, are changing. When the contact area of the ionic liquid or water 260 is changing, the capacitance of the electrode is changing, thereby generating electrical energy.

Figure 3:
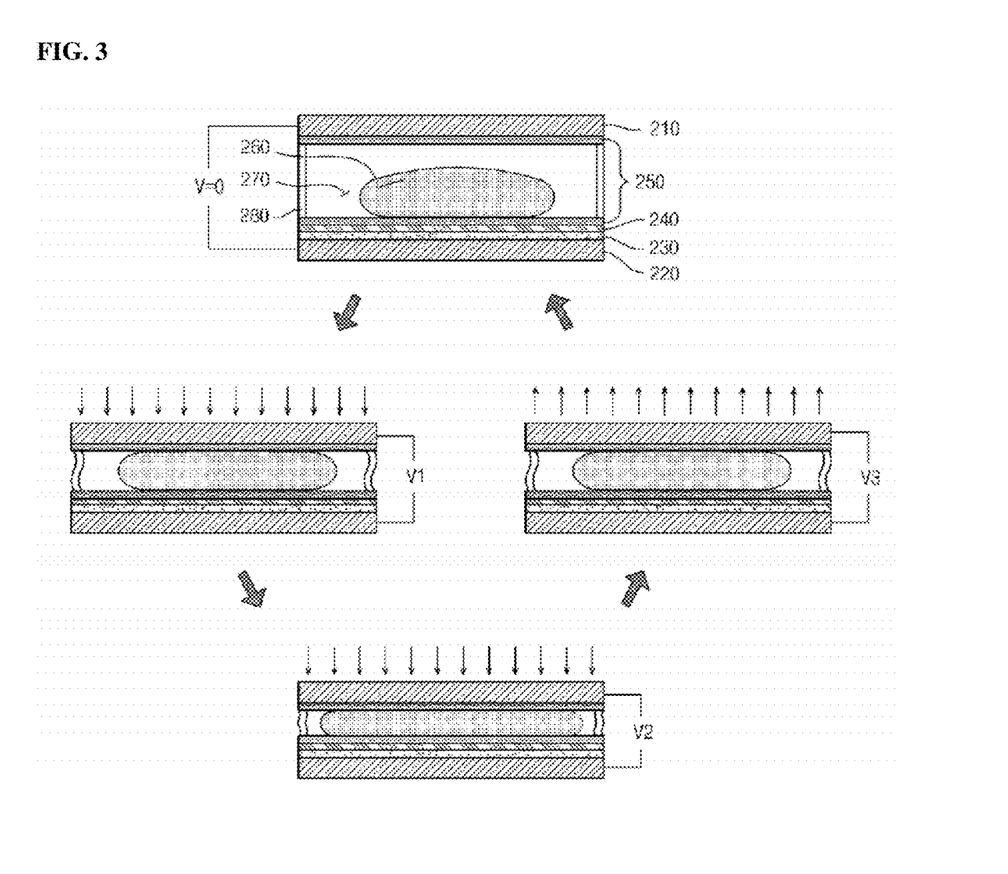
FIG. 3 is a conceptual diagram describing the operation principle of a device for converting energy using the contact angle and the contact area of a liquid according to an exemplary embodiment of the present invention.

FIG. 3 is a drawing showing the energy generation process by a device for converting energy using a fluid according to an exemplary embodiment of the present invention. As illustrated in FIG. 3, initially, the generated electrical energy output of the device for converting energy using a fluid according to an exemplary embodiment of the present invention is 0. Later, by applying an external physical force to the upper electrode substrate 210, electrical energy V1, V2 having a consistent polarity are generated as the contact area between the ionic liquid or water 260 and the upper electrode substrate 210 or the lower electrode substrate 220 varies. At this time, when the external physical force is removed or reduced, the ionic liquid or water is restored to the original shape as the gap between the upper electrode substrate and the lower electrode substrate becomes wider, thus, again the contact area between the ionic liquid or water varies, thereby generating another electrical energy V3 having an opposite polarity than the case when an external physical force is applied thereto.

Again according to FIG. 2, a device for converting energy using a fluid according to an exemplary embodiment of the present invention further includes a partition 280 which supports a gap between the lower electrode substrate 220 and the upper electrode substrate 210.

The partition 280, as illustrated in FIG. 3, has restoring force or flexibility, wherein shape change occurs by an external physical force, and restores its original shape when the external physical force is removed According to a preferred exemplary embodiment of the present invention, the lower electrode substrate 220 or the upper electrode substrate 210 may also be configured to have restoring force or flexibility.

Preferably, although the partition 280 is a rigid form, the contact with the lower electrode substrate 220 or the upper electrode substrate 210 is flexible so the partition 280 may be freely pushed away, or the upper electrode substrate 210 may be flexible while the partition 280 and the lower electrode substrate 220 are rigid, or both may be flexible. It can be configured if the structure is capable of generating change in the contact area where the upper electrode substrate 210 and the ionic liquid or water 260 are in contact, by an external physical force.

According to a preferred exemplary embodiment of the present invention, the height of the partition 280, or the gap between the upper electrode substrate and the lower electrode substrate is determined by the size of the diameter of the ionic liquid or water 260, and preferably it would be no more than two times of the diameter of the ionic liquid or water 260. Besides, during the operation of energy conversion, the gap between the upper electrode substrate 210 and the lower electrode substrate 220 must be smaller than the diameter of the ionic liquid or water 260.

In addition, according to another preferred exemplary embodiment of the present invention, the partition 280 has at least any one shape of a rectangle, a triangle, an inverted triangle, a circle, an ellipse, or a cylinder.

Thus, an energy conversion device according to an exemplary embodiment of the present invention can be connected in array form by the partition 280. In other words, said energy conversion device may have a triangular shape, a rectangular shape, a pentagonal shape, a hexagonal shape, a circular shape, a grid shape, or a honeycomb shape by the partition 280.

In addition, preferably, the shape of the partition 280 may be a rectangle, a triangle, an inverted triangle, a circle, an ellipse, or a cylinder, and the shape of a unit cell (comprising an upper plate, a lower plate, a partition, a liquid, and a gas) of the energy conversion device could possibly be a triangular shape, a rectangular shape, a pentagonal shape, a hexagonal shape, a circular shape, a grid shape, or a honeycomb shape.

According to a preferred exemplary embodiment of the present invention, an energy conversion device according to an exemplary embodiment of the present invention includes an energy conversion layer formed by stacking an inorganic material layer 230 and an organic material layer 240 on the lower electrode substrate 220 and/or the upper electrode substrate 210. Method such as patterning, vacuum deposition, or spin coating may be used in forming an energy conversion layer.

In stacking the inorganic material layer 230 and the organic material layer 240 on the lower electrode substrate 220 or on the upper electrode substrate 210, the order of stacking will not matter, however, they must be stacked adjacently.

Preferably, the inorganic material layer 230 and the organic material layer 240 may be alternately and repeatedly filed up when being stacked on the lower electrode substrate 220 or on the upper electrode substrate 210. In other words, an energy conversion layer can be formed by repeatedly stacking the inorganic material layer 230 and the organic material layer 240.

According to a preferred exemplary embodiment of the present invention, a hydrophobic material layer 250 is further stacked on the energy conversion layer comprising the inorganic material layer 230 and the organic material layer 240 so that the shape of said ionic liquid or water 260 is restored to its original shape when the external physical force is removed.

Preferably, the hydrophobic material layer 250 may be stacked on the upper electrode substrate 210 and the lower electrode substrate 220 wherein the energy conversion layer is not yet formed.

According to a preferred exemplary embodiment of the present invention, the organic material layer 240 includes at least any one material or the combination of polymethylmethacrylate(PMMA), polyethylene(PE), polystyrene(PS), polyvinylpyrrolidone(PVP), poly(4-vinylpenol; PVP) or polyethersulfone(PES), poly(4-methoxyphenylacrylate; PMPA), poly(phenylacrylate; PPA), poly(2,2,2-trifluoroethyl methacrylate; PTFMA), cyanoethylpullulan(CYEPL), polyvinyl chloride(PVC), poly(parabanic acid resin; PPA), poly(t-butylstyrene; PTBS), polythienylenevinylene(PTV), polyvinylacetate(PVA), poly(vinyl alcohol; PVA), poly(rm-ethylstyrene; PAMS), poly(vinyl alcohol)-co-poly(vinyl acetate)-co-poly(itaconic acid)(PVAIA), polyolefin, polyacrylate, parylene-C, polyimide, octadecyltrichlorosilane (OTS), poly(triarylamine; PTTA), poly-3-hexylthiophene (P3HT), cross-linked poly-4-vinylphenol (cross-linked PVP), poly(perfluoroalkenylvinyl ether), nylon-6, n-octadecylphosphonic acid(ODPA), and said inorganic material layer includes at least any one material of $SiO_2$, $TiO_2$, $Al_2O_3$, $Ta_2O_5$, tantalum pentoxide, zinc oxide(ZnO), tantalum pentoxide($Ta_2O_5$), yttrium oxide($Y_2O_3$), cerium oxide($CeO_2$), titanium dioxide($TiO_2$), barium titanate($BaTiO_3$), barium zirconate titanate(BZT), zirconium dioxide($ZrO_2$), lanthanum oxide($La_2O_3$), hafnon($HfSiO_4$), lanthanum aluminate ($LaAlO_3$), silicon nitride($Si_3N_4$), as perovskite materials, strontium titanate($SrTiO3$), barium strontium titanate(BST), lead zirconate titanate(PZT), calcium copper titanate(C-CTO), or $HfO_2$.

Preferably, a material having dielectric constant (K) lower than 4, may be used for the organic material 240; and a material having dielectric constant (K) higher than 5 may be used for the inorganic material 230.

According to another preferred exemplary embodiment of the present invention, in the lower electrode substrate 220 or the upper electrode substrate 210 of an energy conversion device using a fluid according to an exemplary embodiment of the present invention, a hydrophobic material layer 250 is stacked on the energy conversion layer comprising the inorganic material layer 230 and the organic material layer 240 so that the shape of said ionic liquid or water 260 is restored to its original shape when the external physical force is removed.

The hydrophobic material layer 250 comprises at least any one or a mixture of silane family material, fluoropolymer material, trichlorosilane, trimethoxysilane, pentafluorophenylpropyltrichlorosilane, (benzyloxy)alkyltrimethoxysilane(BSM-22), (benzyloxy)alkyltrichlorosilane(BTS), hexamethyldisilazane(HMDS), octadecyltrichlorosilane (OTS), octadecyltrimethoxysilane(OTMS), and divinyltetramethyldisiloxane-bis(benzocyclobutene)(BCB).

According to a preferred exemplary embodiment of the present invention, the electrode used in the lower electrode substrate 220 or the upper electrode substrate 210 is an is an inorganic electrode including at least any one of ITO, IGO, chrome, aluminum, indium zinc oxide(IZO), indium gallium zinc oxide(IGZO), ZnO, $ZnO_2$ or $TiO_2$; or a metal electrode including at least any one of aluminum, iron or copper; or an organic electrode including at least any one of polyethylenedioxythiophene(PEDOT), carbon nano tube(CNT), graphene, polyacetylene, polythiophene(PT), polypyrrole, polyparaphenylene(PPV), polyanilinep), poly sulfur nitride or polyparaphenylenevinylene.

According to a preferred exemplary embodiment of the present invention, the lower electrode substrate 220 or the upper electrode substrate 210 is a metal electrode, a glass electrode, or a polymer material substrate. Here, the polymer material substrate is a plastic substrate or a film including at least any one of polyethylene terephthalate(PET), polyarylate(PAR), polymethylmethacrylate(PMMA), polyethylenenaphthalate (PEN), polyethersulfone(PES), polyimide(PI), polycarbonate(PC) or fiber reinforced plastics(FRP).

According to a preferred exemplary embodiment of the present invention, a water may be used, and the ionic liquid 260 includes at least any one of NaCl, LiCl, $NaNo_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol or AgCl.

According to a preferred exemplary embodiment of the present invention, the non-conductive gas 270 includes at least any one of air, oxygen, nitrogen, argon, helium, neon, krypton, xenon, or radon.

For an energy conversion device using a fluid according to another exemplary embodiment of the present invention, the above described said energy conversion devices using a fluid are being formed into a multiply connected arrangement, wherein the electrodes which are included in the lower electrode substrate 220 or the upper electrode substrate 210 are separately provided or used by more than two of the energy conversion devices.

Figure 4:
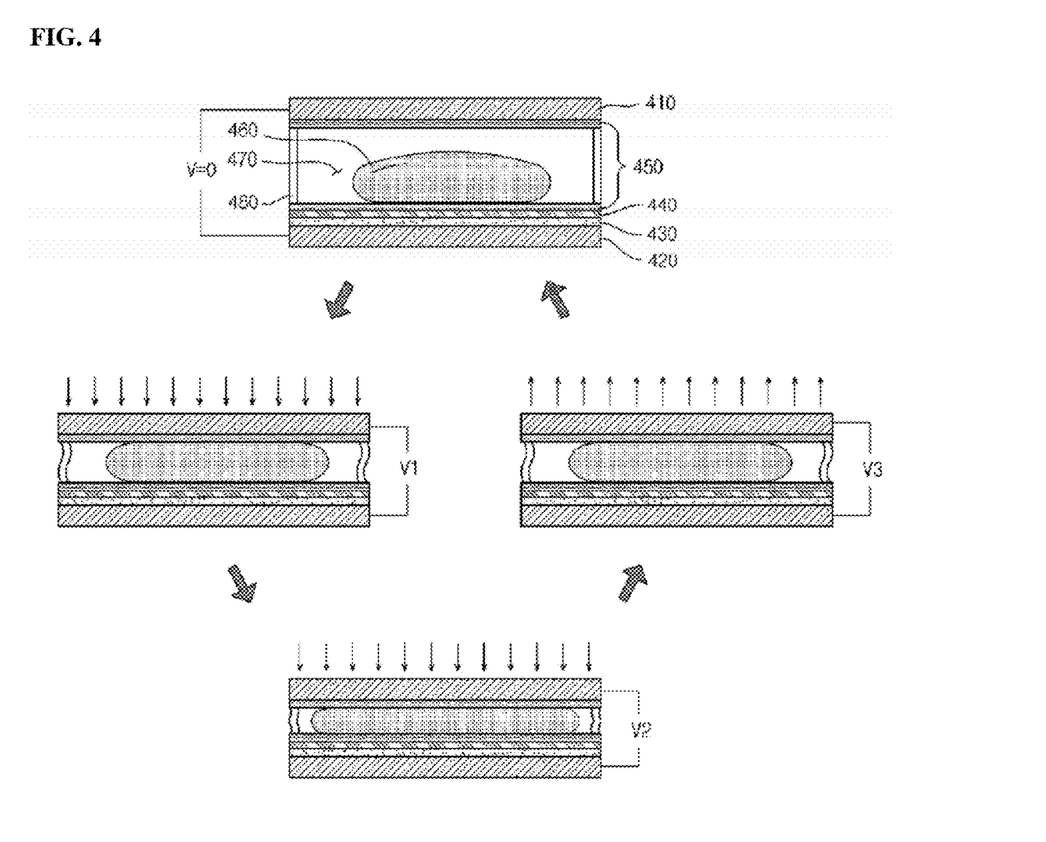
FIG. 4 is a conceptual diagram describing the operation principle of a device for converting energy using the contact angle and the contact area of a liquid according to another exemplary embodiment of the present invention.

FIG. 4 is a conceptual diagram illustrating another device for converting energy using the contact angle and the contact area of a liquid according to the present invention. According to FIG. 4, a device for converting energy using a fluid according to another exemplary embodiment of the present invention includes a lower electrode substrate 420 and an upper electrode substrate 410 facing each other, wherein electrodes are disposed on both the electrode substrate and a conductive liquid 460 is located in between the pair of electrodes. A non-conductive gas 470 is filled in the space between the lower electrode substrate 420 and the upper electrode substrate 410. In addition, an energy conversion layer for performing depolarizing function for the ionic liquid is formed on the lower electrode substrate 420 or the upper electrode substrate 410 according to the changes in the contact angle and the contact area between the conductive liquid 460 and at least any one of the lower electrode substrate 420 and the upper electrode substrate 410.

Preferably, the upper electrode substrate 410 or the lower electrode substrate 420 includes an electrode, and such electrodes are insulated from the conductive liquid 460.

In such a device for converting energy using the contact angle and the contact area of a liquid according to an exemplary embodiment of the present invention, the distance between the upper electrode substrate 410 and the lower electrode substrate 420, i.e. the gap, is changing when an external physical force is applied, and by the reacting force thereof, the contact area and the contact angle of the conductive liquid 460, which are being contact with the upper electrode substrate 410 or the lower electrode substrate 420, are changing. When the contact area of the conductive liquid 460 is changing, the capacitance of the electrode is changing, thereby generating electrical energy.

According to a preferred exemplary embodiment of the present invention, it is advantageous in that said conductive liquid 460 may use mercury, lithium, gallium, kalium, NaK, bismuth, tin, natrium, natrium-kalium alloy, and the like; the range of the specific resistivity is $1\ \mu\Omega/\S^-$ to $1000\mu\Omega/\S^-$, and the dielectric constant K is under 5.

According to a preferred exemplary embodiment of the present invention, the energy conversion layer may be formed on both of the upper electrode substrate 410 and the lower electrode substrate 420, and may be configured to be a laminated form of an inorganic material layer 430 and an organic material layer 440, and patterning, vacuum deposition, and the like may be used as a stacking method.

According to another preferred exemplary embodiment of the present invention, on the energy conversion layer formed by stacking an inorganic material layer 430 and an organic material layer 440, a hydrophile material layer 450 is further stacked so that the shape of said conductive liquid 460 can be restored to the original shape when the external physical force is removed.

Preferably, the hydrophile material layer 450 may be stacked on the upper electrode substrate 410 and the lower electrode substrate 420 wherein the energy conversion layer is not yet formed.

According to a preferred exemplary embodiment of the present invention, the hydrophile material layer 450 includes at least any one material of poly acrylic acid(PAA), acrylamides, maleic anhydride copolymers, methacrylate, ethacrylate, amine-functional polymers, amine-functional polymers, polystyrenesulfonate(PSS), vinyl acids, vinyl alcohols, or functional group of —NH, —CO—, amino group —NH2, hydroxyl group —OH or carboxyl group —COOH.

Besides, in the present invention using a conductive liquid, the detailed descriptions of the technical contents related to features, structures, and the like of the materials for the electrode or the substrate constituting the upper electrode substrate 410 or the lower electrode substrate 420, the inorganic material layer 430, the organic material layer 440, the non-conductive gas 470, and the partition 480 are omitted since it can be configured according to the foregoing exemplary embodiments using a ionic liquid or the contents described in FIG. 2 or FIG. 3.

As reviewed before, when compared with prior art using more than two different kinds of liquids, the present invention may prevent blocking and mixing phenomena inside the channel, and also it does not require any lubricating layer.

Furthermore, although the technologies of prior art suggests an insulation layer comprising a single self assembly molecular monolayer and a single dielectric layer, or more layers of non-conductive layers, or the various combination thereof, however, the present invention suggests a structure for optimizing the energy conversion efficiency.

In other words, when using an ionic liquid, (according to the stacking order) a structure of electrode/inorganic material layer/organic material layer/hydrophobic material layer, or a structure of electrode/organic material layer/inorganic material layer/hydrophobic material layer is configured on at least one side of the substrate of the upper electrode substrate or the lower electrode substrate; while when using a conductive liquid, (according to the stacking order) a structure of electrode/inorganic material layer/organic material layer/hydrophile material layer, or a structure of electrode/organic material layer/inorganic material layer/hydrophile material layer is configured on both of the substrate of the upper electrode substrate and the lower electrode substrate And, application of an external power source for depolarization is required in using a conductive liquid according to the technology of prior art, however, application of an external power source is not required in the present invention since the energy conversion layer performs depolarizing function for the ionic liquid Although the preferred exemplary embodiments and the application examples are illustrated and described, heretofore, the present invention is not limited by the above described specific exemplary embodiments and the application examples, naturally, various variant embodiments are possible by a person of ordinary skill in the art without departing the gist of the present invention claimed within the scope of the claims, and these variant embodiments should not be individually understood from the technical spirit or the expectation of the present invention.

Description of Symbols

| | |
|---|---|
| 210: upper electrode substrate, | 220: lower electrode substrate |
| 230: inorganic material layer | 240: organic material layer |
| 250: hydrofphile material layer | 260: ionic liquid or water |
| 270: non-conductive gas, | 280: partition |

What is claimed is:

1. An energy converting device utilizing changes in a contact angle and a contact area of a liquid comprising:
    a lower electrode substrate and an upper electrode substrate, wherein a gap between the lower electrode substrate and the upper electrode substrate is changing by an external physical force;
    an ionic liquid or a water whose contact angle and contact area with at least one from the lower electrode substrate and the upper electrode substrate are changing in accordance with the changes in the gap between the lower electrode substrate and the upper electrode substrate; and
    an energy conversion layer performs depolarizing function for the ionic liquid or the water, and said energy conversion layer is formed on at least one of the lower electrode substrate and the upper electrode substrate, wherein electrical energy is generated in accordance with the changes in said contact angle and said contact area.

2. The energy converting device according to claim 1, further comprising a partition configured to maintain the gap between said lower electrode substrate and said upper electrode substrate, and configured to isolate an inside and an outside of the energy converting device.

3. The energy converting device according to claim 2, further comprising a non-conductive gas disposed between said lower electrode substrate and said upper electrode substrate, which are separated by said partition.

4. The energy converting device according to claim 1, wherein said energy conversion layer comprises an inorganic material layer and an organic material layer.

5. The energy converting device according to claim 1, wherein said lower electrode substrate or said upper electrode substrate is flexible so as to be restored to an original shape thereof when the external physical force is removed.

6. The energy converting device according to claim 2, wherein said partition has at least one shape selected from the group consisting of a rectangle, a triangle, an inverted triangle, a circle, an ellipse, and a cylinder, and
    wherein the energy converting device is formed to be a triangular shape, a rectangular shape, a pentagonal shape, a hexagonal shape, a circular shape, a grid shape, or a honeycomb shape by the shape of said partition, so that said energy converting device can be connected in arrays when a plurality of the energy converting devices are provided together.

7. The energy converting device according to claim 4, wherein the gap between said upper electrode substrate and said lower electrode substrate is determined by a size of said ionic liquid or said water.

8. The energy converting device according to claim 4,
    wherein said organic material layer comprises at least one material selected from the group consisting of polymethylmethacrylate(PMMA), polyethylene(PE), polystyrene(PS), polyvinylpyrrolidone(PVP), poly(4-vinylpenol; PVP), polyethersulfone(PES), poly(4-methoxyphenylacrylate; PMPA), poly(phenylacrylate; PPA), poly(2,2,2-trifluoroethyl methacrylate; PTFMA), cyanoethylpullulan(CYEPL), polyvinyl chloride (PVC), poly(parabanic acid resin; PPA), poly(t-butylstyrene; PTBS), polythienylenevinylene(PTV), polyvinylacetate(PVA), poly(vinyl alcohol; PVA), poly (rmethylstyrene; PAMS), poly(vinyl alcohol)-co-poly (vinyl acetate)-co-poly(itaconic acid)(PVAIA), polyolefin, polyacrylate, parylene-C, polyimide, octadecyltrichlorosilane(OTS), poly(triarylamine; PTTA), poly-3-hexylthiophene(P3HT), cross-linked poly-4-vinylphenol(cross-linked PVP), poly(perfluoroalkenylvinyl ether), nylon-6, and n-octadecylphosphonic acid (ODPA); and
    wherein said inorganic material layer comprises at least one material selected from the group consisting of $SiO_2$, $TiO_2$, $Al_2O_3$, $Ta_2O_5$, tantalum pentoxide, zinc oxide(ZnO), tantalum pentoxide($Ta_2O_5$), yttrium oxide ($Y_2O_3$), cerium oxide($CeO_2$), titanium dioxide($TiO_2$), barium titanate($BaTiO_3$), barium zirconate titanate (BZT), zirconium dioxide($ZrO_2$), lanthanum oxide ($La_2O_3$), hafnon($HfSiO_4$), lanthanum aluminate ($LaAlO_3$), silicon nitride($Si_3N_4$), as perovskite materials, strontium titanate(SrTiO3), barium strontium titanate(BST), lead zirconate titanate(PZT), calcium copper titanate(CCTO), and $HfO_2$.

9. The energy converting device according to claim 4, further comprising a hydrophobic material layer which is provided on the energy conversion layer,
    wherein said hydrophobic material layer comprises at least one selected from the group consisting of silane family material, fluoropolymer material, trichlorosilane, trimethoxysilane, pentafluorophenylpropyltrichlorosilane, (benzyloxy)alkyltrimethoxysilane (BSM-22), (benzyloxy)alkyltrichlorosilane(BTS), hexamethyldisilazane(HMDS), octadecyltrichlorosilane(OTS), octadecyltrimethoxysilane(OTMS), and divinyltetramethyldisiloxane-bis(benzocyclobutene) (BCB).

10. The energy converting device according to claim 4,
    wherein said lower electrode substrate or said upper electrode substrate comprises:
    an inorganic electrode comprising at least one selected from the group consisting of ITO, IGO, chrome, aluminum, indium zinc oxide(IZO), indium gallium zinc oxide(IGZO), ZnO, $ZnO_2$ and $TiO_2$;

a metal electrode comprising at least one selected from the group consisting of aluminum, iron and copper; or an organic electrode comprising at least one selected from the group consisting of polyethylenedioxythiophene (PEDOT), carbon nano tube(CNT), graphene, polyacetylene, polythiophene(PT), polypyrrole, polyparaphenylene(PPV), polyanilinep), poly sulfur nitride and polyparaphenylenevinylene.

11. The energy converting device according to claim 4, wherein at least one of said lower electrode substrate or said upper electrode substrate is a metal substrate, a glass substrate, or a polymer material substrate; said polymer material substrate comprising at least one selected from the group consisting of polyethylene terephthalate(PET), polyarylate (PAR), polymethylmethacrylate(PMMA), polyethylenenaphthalate(PEN), polyethersulfone(PES), polyimide (PI), polycarbonate(PC) and fiber reinforced plastics(FRP).

12. The energy converting device according to claim 4,
    wherein said ionic liquid comprises at least one selected from the group consisting of NaCl, LiCl, $NaNo_3$, $Na_2SiO_3$, $AlCl_3$—NaCl, LiCl—KCl, $H_2O$, KCL, Na,NaOH $H_2SO_4$, $CH_3COOH$, HF, $CuSO_4$, ethylene glycol, propylene glycol and AgCl.

13. The energy converting device according to claim 3,
    wherein said non-conductive gas comprises at least one selected from the group consisting of air, oxygen, nitrogen, argon, helium, neon, krypton, xenon, and radon.

14. An energy converting device utilizing changes in a contact angle and a contact area of a liquid comprising:
    a lower electrode substrate and an upper electrode substrate, wherein a gap between the lower electrode substrate and the upper electrode substrate is being changed by an external physical force;
    a conductive liquid whose contact angle and contact area with at least one from the lower electrode substrate and the upper electrode substrate are changing in accordance with the changes in the gap between the lower electrode substrate and the upper electrode substrate;
    an energy conversion layer performs depolarizing function for the conductive liquid, and said energy conversion layer is formed on said lower electrode substrate or said upper electrode substrate, wherein electrical energy is generated in accordance with said changes; and
    a hydrophilic material layer which is stacked on said energy conversion layer so that a shape of said conductive liquid is being restored to an original shape when the external physical force is removed.

15. The energy converting device according to claim 14, further comprising a partition configured to maintain the gap between said lower electrode substrate and said upper electrode substrate, and configured to isolate an inside and an outside of the device.

16. The energy converting device according to claim 15, further comprising a non-conductive gas disposed between said lower electrode substrate and said upper electrode substrate, which are separated by said partition.

17. The energy converting device according to claim 14, wherein said energy conversion layer comprises an inorganic material layer and an organic material layer.

18. The energy converting device according to claim 14, wherein said lower electrode substrate or said upper electrode substrate is being restored to an original shape thereof when the external physical force is removed.

19. The energy converting device according to claim 15, wherein said partition has at least one shape selected from the group consisting of a rectangle, a triangle, an inverted triangle, a circle, an ellipse, and a cylinder, and wherein the energy converting device is formed to be a triangular shape, a rectangular shape, a pentagonal shape, a hexagonal shape, a circular shape, a grid shape, or a honeycomb shape by the shape of said partition, so that said energy converting device can be connected in arrays when a plurality of the energy converting devices are provided together.

20. The energy converting device according to claim 17, wherein the gap between said upper electrode substrate and said lower electrode substrate is determined by the size of said conductive liquid.

21. The energy converting device according to claim 17, wherein said organic material layer comprises at least one material selected from the group consisting of polymethylmethacrylate(PMMA), polyethylene(PE), polystyrene(PS), polyvinylpyrrolidone(PVP), poly(4-vinylpenol; PVP), polyethersulfone(PES), poly(4-methoxyphenylacrylate; PMPA), poly(phenylacrylate; PPA), poly(2,2,2-trifluoroethyl methacrylate; PTFMA), cyanoethylpullulan(CYEPL), polyvinyl chloride (PVC), poly(parabanic acid resin; PPA), poly(t-butylstyrene; PTBS), polythienylenevinylene(PTV), polyvinylacetate(PVA), poly(vinyl alcohol; PVA), poly(rmethylstyrene; PAMS), poly(vinyl alcohol)-co-poly(vinyl acetate)-co-poly(itaconic acid)(PVAIA), polyolefin, polyacrylate, parylene-C, polyimide, octadecyltrichlorosilane(OTS), poly(triarylamine; PTTA), poly-3-hexylthiophene(P3HT), cross-linked poly-4-vinylphenol(cross-linked PVP), poly(perfluoroalkenylvinyl ether), nylon-6, and n-octadecylphosphonic acid (ODPA); and
    wherein said inorganic material layer comprises at least one material selected from the group consisting of $SiO_2$, $TiO_2$, $Al_2O_3$, $Ta_2O_5$, tantalum pentoxide, zinc oxide(ZnO), tantalum pentoxide($Ta_2O_5$), yttrium oxide ($Y_2O_3$), cerium oxide($CeO_2$), titanium dioxide($TiO_2$), barium titanate($BaTiO_3$), barium zirconate titanate (BZT), zirconium dioxide($ZrO_2$), lanthanum oxide ($La_2O_3$), hafnon($HfSiO_4$), lanthanum aluminate ($LaAlO_3$), silicon nitride($Si_3N_4$), as perovskite materials, strontium titanate(SrTiO3), barium strontium titanate(BST), lead zirconate titanate(PZT), calcium copper titanate(CCTO), and $HfO_2$.

22. The energy converting device according to claim 17, further comprising a hydrophobic material layer which is provided on the energy conversion layer,
    wherein said hydrophobic material layer comprises at least one material selected from the group consisting of poly acrylic acid(PAA), acrylamides, maleic anhydride copolymers, methacrylate, ethacrylate, amine-functional polymers, amine-functional polymers, polystyrenesulfonate(PSS), vinyl acids, vinyl alcohols, and a material having at least one functional group of —NH, —CO—, amino group —NH2, hydroxyl group —OH and carboxyl group —COOH.

23. The energy converting device according to claim 17, wherein said lower electrode substrate or said upper electrode substrate comprises:
    an inorganic electrode comprising at least one selected from the group consisting of ITO, IGO, chrome, aluminum, indium zinc oxide(IZO), indium gallium zinc oxide(IGZO), ZnO, $ZnO_2$ and $TiO_2$;

a metal electrode comprising at least one selected from the group consisting of aluminum, iron and copper; or an organic electrode comprising at least one selected from the group consisting of polyethylenedioxythiophene (PEDOT), carbon nano tube(CNT), graphene, polyacetylene, polythiophene(PT), polypyrrole, polyparaphenylene(PPV), polyanilinep), poly sulfur nitride and polyparaphenylenevinylene.

24. The energy converting device according to claim 17, wherein at least one of said lower electrode substrate or said upper electrode substrate is a metal substrate, a glass substrate, or a polymer material substrate; said polymer material substrate comprising at least one selected from the group consisting of polyethylene terephthalate(PET), polyarylate(PAR), polymethylmethacrylate(PMMA), polyethylenenaphthalate(PEN), polyethersulfone(PES), polyimide(PI), polycarbonate (PC) and fiber reinforced plastics(FRP).

25. The energy converting device according to claim 17, wherein said conductive liquid comprises mercury, lithium, gallium, kalium, NaK, bismuth, tin, natrium, natrium-kalium alloy, or the like;

a range of a specific resistivity of the conductive liquid is 1 µΩ/cm to 1000 µΩ/cm, and a dielectric constant K of the conductive liquid is under 5.

26. The energy converting device according to claim 16, wherein said non-conductive gas comprises at least one selected from the group consisting of air, oxygen, nitrogen, argon, helium, neon, krypton, xenon, and radon.

\* \* \* \* \*